March 18, 1952  G. O. TURNBULL  2,589,897

VARIABLE V BELT PULLEY DRIVE

Filed Dec. 29, 1949  2 SHEETS—SHEET 1

INVENTOR.
Glen O. Turnbull
BY Paul O. Pippes
Atty.

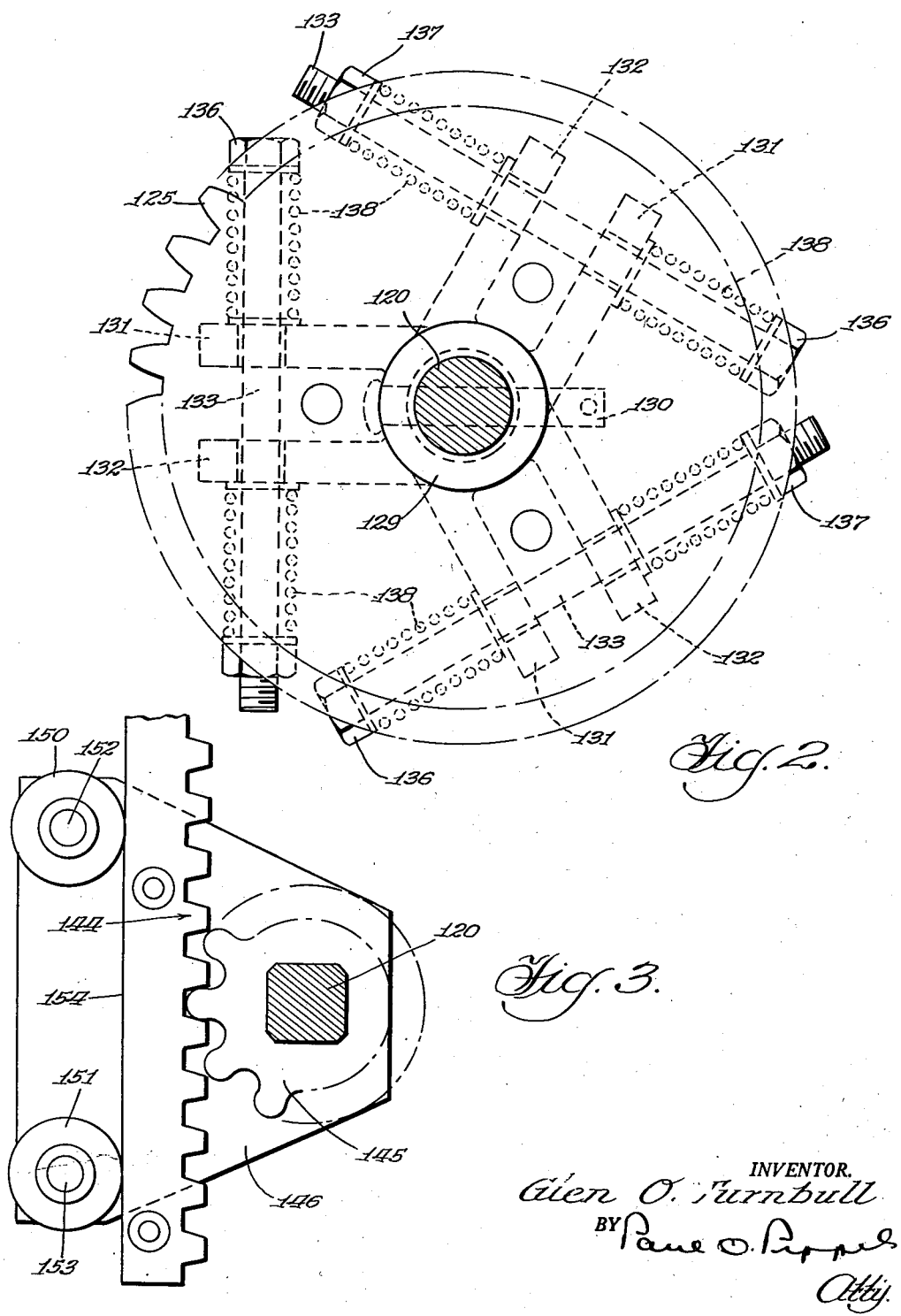

Patented Mar. 18, 1952

2,589,897

UNITED STATES PATENT OFFICE 2,589,897

VARIABLE V BELT PULLEY DRIVE

Glen O. Turnbull, Rock Island, Ill., assignor to International Harvester Company, a corporation of New Jersey Application December 29, 1949, Serial No. 135,556

4 Claims. (Cl. 74—230.17)

This invention relates to a new and improved variable V-belt pulley drive.

Variable speeds of V-belt pulleys are accomplished by changing the space between the pulley halves and thereupon causing the belt to ride lower or higher within the pulley. In a belt drive the spaced pulleys carrying the belt must be shifted an equal amount in order that the length of the belt in the driving transmission remains constant. There are various methods of effecting a shifting of the pulley halves. Nearly all of these prior methods or apparatus employ direct acting springs for maintaining the pulley halves resiliently together. Therefore, upon an increase in load the pulley halves open up, causing the belt to drop to the bottom of the pulley groove and slip, resulting in loss of torque and damaged belts. In order to overcome this deficiency in their product these prior manufacturers have increased the spring pressure to handle overloads and thus under normal loading the belt has to carry excessive side pressure with the result that the belt life is considerably reduced.

An important object of this invention is to provide a variable speed belt drive which will remain fixed in any desired position under overload conditions.

Another important object of this invention is the provision of means in a variable V-belt transmission drive for changing the spacing of cooperating pulley halves without a direct application of spring force which tends to cause considerable damage to the belt.

A still further important object of this invention is to supply in a belt transmission apparatus automatic means for simultaneously shifting cooperating pulley halves through an equal distance to insure constantly uniform belt tension.

Still another object of this invention is to provide means in conjunction with an automatic device for obtaining uniform belt tension a means for manually changing the relative spacings of the cooperative belt pulley halves to thereby effect a change in the transmission of the resultant driven speeds.

Another and further important object of this invention is the provision of a central control shaft for V-belt pulley drives in which the pulley halves of the spaced pulleys are capable of simultaneous movement toward and away from their respective stationary pulley halves in cooperation with means for longitudinally shifting the central control shaft so that the V-belt drive is maintained in proper alignment with the spaced pulleys.

Other and further important objects of this invention will become apparent from the disclosures in the following specification and accompanying drawings.

In the drawings:

Fig. 2 is a sectional view taken on the line 2—2 of Fig. 1.

Fig. 3 is a sectional view of a portion of the device taken on the line 3—3 of Fig. 1.

As shown in the drawings:

Figure 1:
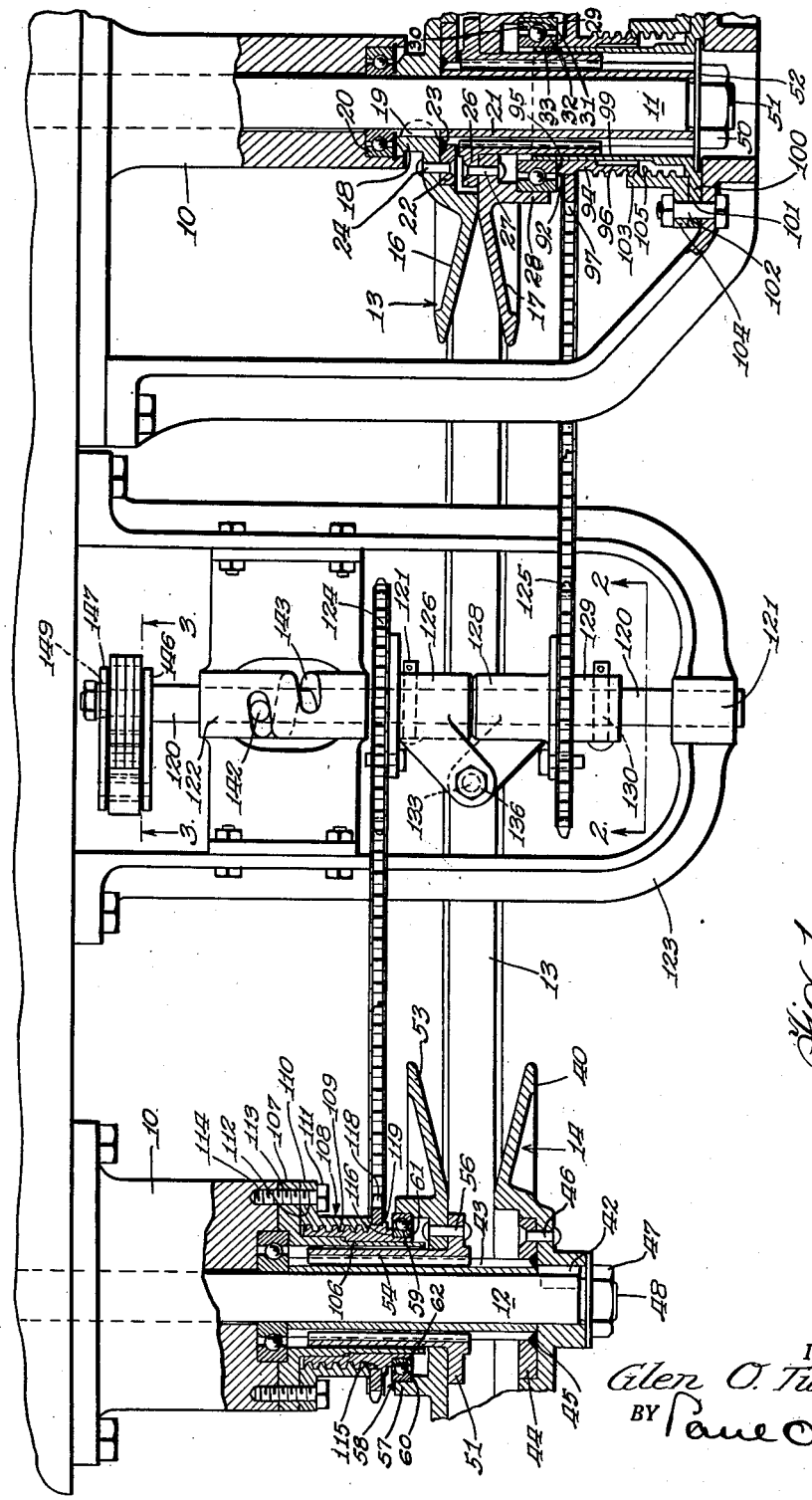
Fig. 1 is a top plan view partially in section of the variable V-belt drive of this invention.

The reference numeral 10 indicates generally a supporting structure having a driving shaft 11 journaled in one portion thereof and a driven shaft 12 lying parallel to and spaced from the driven shaft 11 and similarly journaled within the supporting structure 10. The V-belt pulley 13 is mounted over the driving shaft 11 and similarly a V-belt pulley 14 is mounted over the driven shaft 12. By means of a V-belt 15 drive is transmitted from the shaft 11 to the shaft 12, both of which are journally mounted in the supporting structure 10.

The V-belt pulley 13 is provided with opposed half sections 16 and 17. The pulley half is provided with a hub portion 18 adapted to surround the shaft 11. A key 19 joins the hub 18 to the shaft 11 for concurrent rotation of these parts. A ball bearing 20 is disposed between the supporting structure 10 and the end of the pulley half hub 18 as well as encircling the shaft 11. The bearing 20 thus is conducive to the rotation of the shaft and hub with respect to the stationary supporting structure 10.

A sleeve 21 is mounted on the shaft 11 and extends from a position adjacent the hub 18 to substantially the end of the shaft. A ring or washer-like member 22 surrounds the sleeve 21 adjacent its inner end and is welded thereto as shown at 23. The ring is fastened by means of rivets 24 to the pulley half 16. It is thus apparent that as the shaft 11 is rotated the pulley half 16 is similarly being rotated along with its integral parts, the sleeve 21 and the ring 22.

The outer surface of the sleeve 21 is externally splined to slidably receive an internally splined sleeve 25 which constitutes a hub for the pulley half 17. The sleeve 25 has an outwardly extending annular flange 26 which is fastened to the pulley half 17 by means of rivets or the like 27. The pulley half 17 is formed with an axially extending annular lip 28 concentric with the shaft 11 for the purpose of receiving a ball bearing 29. The outer race 30 is press-fitted within the sleeve-like lip 28 and abuts a shoulder 31 formed in the lip. The inner bearing race 32 surrounds the sleeve 25 but is spaced therefrom as shown by the clearance 33. The pulley half 17 along with the sleeve hub 25 and the ball bearing 29 is permitted axial movement along the splined sleeve 21 which superposes the shaft 11 and thus the spacing between the pulley halves 16 and 17 may be changed as desired. A sleeve member 94 has its one end 95 in contacting engagement with the outer end of the inner race 32 of the ball bearing 29. The other end of the sleeve 94 contains a threaded portion 96. The threads 96 have a pitch designed for self-locking. The sleeve 94 also contains a sprocket 97 positioned thereover and welded to the sleeve as shown at 98.

A stationary sleeve 99 surrounds the hub 25 of the pulley half 17. The sleeve 99 is provided with an outwardly extending annular flange 100 at the outer end of the sleeve and is equipped with an opening 101 for receiving a bolt 102 for fastening to the yoke supporting member 36. The sleeve 99 forms a bearing support for the sleeve member 94. The sleeve 99 being concentric with the shaft 11 permits relative longitudinal and rotational movement of the sleeve member 94. A second stationary sleeve 103 is spaced outwardly from the stationary sleeve 99 and concentric therewith. The sleeve 103 is similarly provided with an outwardly extending annular flange 104 and as shown in the drawing the flanges 104 and 100 nest against each other and the bolt 102 simultaneously holds the sleeves 99 and 103 rigid with respect to the yoke member 36. The yoke as previously stated forms a part of the supporting structure 10 and thus the concentric guiding sleeves 99 and 103 are stationary in the same manner as the supporting structure 10.

The inner surface of the sleeve 103 is provided with threads 105 to mate with the threads 96 of the operating sleeve member 94. Rotation of the sprocket 97 and thus also the sleeve 94 will cause the sleeve to more or less threadedly engage the internal threads 105 of the outer guide sleeve 103. In the position as shown in the drawing, the movable pulley half 17 is shown in its closest relationship with its cooperative pulley half 16 and thus the operating sleeve 94 is in its maximum withdrawn position from the internally threaded sleeve 103. Rotation of the sprocket 97 to cause a movement of the sleeve 94 away from the inner race 32 of the ball bearing 29 permits a V-belt riding in the pulley 13 to cause a spreading of the pulley half 17 so that in fact the inner race 32 of the bearing will closely follow the retracting sleeve 94. When the pulley half 17 is in a spaced apart position from its cooperative pulley half 16 rotational movement of the sprocket 97 in a direction to cause the sleeve 94 to move outwardly from the threads 105 causes the sleeve to contact the bearing 29 and thereupon impart a direct axial force on the pulley half 17 thereupon causing a V-belt in the pulley to move outwardly within the pulley and thus change the effective size of the pulley.

Similarly the pulley 14 includes a pulley half 40 which has a sleeve-like hub 41 fastened by means of a key 42 to the shaft 12 to be driven. An elongated sleeve 43 is mounted on the shaft 12 in a manner similar to the sleeve 21. An annular ring member 44 is welded to the sleeve 43 at 45 and forms an outwardly extending flange for the sleeve 43. The ring member 44 is fastened to the pulley half 40 by means of rivets 46. Thus, as the pulley half 40 is rotated the structure including the sleeve 43, ring 44, and the shaft 12 will similarly rotate.

A nut 47 threadedly engages the end 48 of the shaft 12 and through the medium of a washer 49 maintains the pulley structure on the confines of the shaft 12. The V pulley 13 and its associated structure is also maintained on the shaft 11 against endwise movement by means of a nut 50 upon threadedly engaging the end 51 of the shaft 11. The nut 50 maintains a washer 52 against the sleeve 21 thus holding the sleeve against axial movement off the end of the shaft 11.

The pulley 14 also includes a pulley half 53 adapted for sliding movement toward and away from the pulley half 40. The sleeve 43 is externally splined to slidably receive an internally splined sleeve 54. The sleeve 54 has an outwardly extending annular flange 55 which is fastened by means of rivets 56 to the pulley half 53. Thus the pulley half 53 with its integral sleeve hub 54 may be moved along the splined sleeve 43 with respect to the pulley half 40 and yet regardless of the position of the pulley half 53 the interengaging splines between the members 43 and 54 cause concurrent rotational drive of both pulley halves 40 and 53. This, of course, is similar to the construction in the pulley 13 wherein the pulley half 17 is movable toward and away from the pulley half 16, maintaining concurrent drive of both pulley halves.

The movable pulley half 53 is equipped with an integral annular lip or sleeve portion 57 spaced from and concentric to the shaft 12 for receiving a ball bearing 58. The outer race 59 of the bearing 58 is press-fitted within the sleeve 57 and its inner end abuts a shoulder 60. The inner race 61 of the bearing 58 surrounds the sleeve hub 54 but is slightly spaced therefrom as shown by the annular clearance 62. An inner guide sleeve 106 is journally mounted around the movable pulley half hub 54. The sleeve 106 is provided with an outwardly extending annular flange 107 which is rigidly fastened to the supporting structure 10. A second or outer guide sleeve 108 is internally threaded as shown at 109 and similarly has an outwardly extending annular flange 110 for attachment to the supporting structure 10. The flanges 107 and 110 are adapted to lie one upon the other and journal members 111 pass through apertures 112 and 113 in the flanges 110 and 107 respectively and engage a threaded socket 114 in the supporting structure 10. Thus the concentric guide sleeves 106 and 108 are rigid with respect to the supporting structure 10 and the movable half 53 of the pulley is arranged for movement with respect to these stationary sleeves.

An operating sleeve 115 has an end 116 for contact engagement of the inner race 61 of the ball bearing 58. The operating sleeve 115 therefore effects shifting movement of the pulley half 53 with respect to its cooperative pulley half 40. The other end of the operating sleeve 115 is provided with an annularly threaded surface 117 for engagement with the internal threads 109 of the guide sleeve 108. A sprocket 118 is welded as shown at 119 to the operating sleeve 108 and rotation of the sprocket causes the operating sleeve 115 to engage more or less threads 109 of the stationary sleeve 108 and thus directly determine the spacing of the pulley halves. The pitch of the cooperative threads 109 and 117 is very low and thus there is a minimum possibility of relative rotational movement of the sleeves 115 and 108 merely upon the application of an axial force applied to the sleeve 115. In other words, the pitch provides a self-locking screw. A centrally positioned control shaft 120 is carried in bearings 121 and 122. The bearings are carried on the stationary supporting structure 10 by means of a suitable bracket 123. The shaft 120 carries spaced sprockets 124 and 125 which are in alignment respectively with the sprockets 97 and 118 respectively. The sprocket 124 pinned or otherwise fastened to the shaft 120 is equipped with a unitary hub 126 and a pin 127 which passes through the hub and the shaft 120, making the connection between the sprocket 124 and the shaft fixed. The sprocket 124 thus cannot have relative rotational movement with respect to the shaft 120 nor can it move longitudinally on the shaft 120.

The sprocket 125 is similarly provided with a laterally extending hub 128 but is permitted relative rotational movement on the shaft 120. The hub 128 thus acts merely as a sleeve bearing for the sprocket 125 in its mounting on the shaft 120. The inner ends of the oppositely and inwardly extending hubs 126 and 128 abut each other to maintain a fixed spacing between the sprockets 124 and 125. A thrust collar 129 is fastened to the shaft 120 as shown by the cross pin 130.

Radially extending ears or lug members 131 and 132 are provided on the hub members 126 and 128 respectively. The lug members 131 and 132 are inclined toward each other and overlap sufficiently so that a shaft member 133 may pass through aligned apertures 134 and 135 in the lug members 131 and 132 respectively as best shown in Fig. 2. The shaft 133 is in the form of a bolt member having a head 136 and an adjustable nut 137 at the outer end thereof. A coil spring 138 is disposed between the bolt head 136 and the lug member 132, and similarly a coil spring 139 is disposed between the nut 137 and the lug 131. The overlapping lug members 131 and 132 are three in number and are evenly disposed around the periphery of the sprocket hubs 126 and 128. The springs 138 and 139 act to impart rotation to the sprockets 124 and 125. Chains 140 and 141 join the sprockets 118 and 124 and 125 and 97 respectively. The springs through the medium of the chains 140 and 141 tend to rotate the sleeves 115 and 94 in such a manner to provide take-up for wear of the V-belt 15 and to provide a constant tension for the belt. The variable V-belt pulleys of this invention are arranged so that as the pulley half of one pulley is moved away from its cooperative pulley half the movable pulley half of the other pulley is drawn closer to its cooperative pulley half and each movable half travels through an equal distance. The length of the V-belt 15 remains constant throughout the entire graduation of driving ratios between the driving and driven pulleys. The adjustment for belt wear and for maintaining constant tension is accomplished automatically by the coil springs 138 and 139 which tend to move the lugs 131 and 132 toward each other.

In the operation of the device driving ratio between the pulleys 13 and 14 is changed merely by pulling one of the chains 140 or 141 in the direction desired and there will be a shifting of the pulley halves 17 and 53 in an equal direction and oppositely with respect to their fixed pulley halves 16 and 40 respectively whereupon the V-belt 15 may ride in any desired position within the grooves of the pulleys 13 and 14. Variations in spacings of the pulley halves require a shifting of the central operating shaft 120 and this is accomplished by means of a pin 142 fastened to the shaft 120 and extending outwardly therefrom and adapted to ride in a spiral shaped cam track 143 in the bearing sleeve 122. Rotation of the shaft 120 thus causes a movement of the pin 142 in the spiral cam groove 143 resulting in longitudinal shifting movement of the shaft 120. Thus the sprockets 124 and 125 are maintained in correct alignment with the sprockets 118 and 97 respectively.

Rotation of the operating shaft 120 may be made in numerous ways. As shown in Fig. 3, the rotation of the shaft 120 is accomplished by a toothed rack 144 and pinion 145. Side bracket plates 146 and 147 are journally mounted over the shaft 120 through aligned openings therein 148 and 149. The spaced plates 146 and 147 carry guide rollers 150 and 151 therebetween on the side of the plates spaced from and journally mounted on the shaft 120. The rollers 150 and 151 are carried in the plates by means of shaft pins 152 and 153 which span the plates 146 and 147. The guide rollers are adapted to engage the back surface 154 of the toothed rack 144 and maintain the rack in engagement with the pinion 145. As the rack 144 is manually shifted the pinion 145 will be rotated and as previously stated as the shaft 120 is rotated it is simultaneously moved axially because of the pin 142 engaging the cam track 143 in the bearing 122.

It is believed that herein is provided a variable V-belt drive transmission which will remain in fixed selected position regardless of overload conditions inasmuch as the pulley halves are not subject to direct action by yieldable spring means. The pulley halves thus will not open up under extreme loads causing the belt to ride in the bottom of the groove and slip, which invariably results in loss of torque and damaged belts. The spring pressure at the central control sprockets provides only enough pressure to maintain proper belt tension and compensation for wear. When the full travel of the springs 138 and 139 has been used for take-up, a new start is made by shifting one chain on the sprocket one tooth.

Various details of construction may be varied throughout a wide range without departing from the principles disclosed herein and I therefore do not propose limiting the patent granted hereon otherwise than as necessitated by the appended claims.

What is claimed is:

1. A variable V-belt pulley drive comprising a supporting structure, spaced parallel shafts journaled in said supporting structure, V-belt pulleys mounted on each of said shafts, each of said pulleys having complementary halves, one of each of said pulley halves having means cooperating therewith for effecting movement toward and away from their respective complementary pulley halves, a control shaft journaled on said supporting structure and disposed between the pulley shafts, said means for effecting movement of the pulley halves including a pulley half hub splined on each of said spaced shafts, a sleeve journaled for separate rotational movement on said hub, said sleeve arranged and constructed for joint longitudinal movement with said hub, said sleeve having a low pitch thread engageable with a correspondingly pitched thread on said supporting structure whereby rotational movement of said sleeve will effect longitudinal sliding movement of the sleeve and hub along said shaft, a sprocket mounted integrally with each of said sleeves, a pair of spaced sprockets carried on said control shaft so that one of the pair of sprockets is in alignment with one of the sprockets on one sleeve and the other of said pair of sprockets is in alignment with the sprocket on the other sleeve, chain means joining the aligned sprockets, hub members forming a part of each of the pair of sprockets on the control shaft, one of said pair of sprockets and its hub fixedly fastened to said control shaft, spring means interposed between said fixed sprocket and the other of said pair of sprockets, a V-belt extending around the spaced pulleys, said interposed spring means tending to maintain a constant tension on said belt without permitting the pulley halves to open up on direct outward belt forces on the movable pulley halves.

2. A device as set forth in claim 1 in which the interposed spring means includes inwardly inclined lug members on each of said sprocket hubs, said lugs having aligned apertures, a shaft extending through said aligned apertures and having shoulder stops at each end thereof, and spring members disposed between each of the lug members and their adjacent shaft shoulder.

3. A device as set forth in claim 1 in which means is provided for rotating the control shaft, said means comprising a rack and pinion.

4. A device as set forth in claim 1 in which means is provided for axial shifting of the control shaft, said means including a screw cam.

GLEN O. TURNBULL.

REFERENCES CITED

The following references are of record in the file of this patent:

UNITED STATES PATENTS

| Number | Name | Date |
| --- | --- | --- |
| 2,170,838 | Rossman | Aug. 29, 1939 |
| 2,195,952 | Capocefalo | Apr. 2, 1940 |
| 2,199,491 | Heynaud | May 7, 1940 |
| 2,259,567 | Johnson | Oct. 21, 1941 |
| 2,262,782 | Strom | Nov. 18, 1941 |
| 2,267,566 | Johnson | Dec. 23, 1941 |